US006945704B2

(12) United States Patent
Yamaguchi

(10) Patent No.: US 6,945,704 B2
(45) Date of Patent: Sep. 20, 2005

(54) OPTICAL CONNECTOR

(75) Inventor: Noboru Yamaguchi, Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 10/446,965

(22) Filed: May 29, 2003

(65) Prior Publication Data

US 2005/0141816 A1 Jun. 30, 2005

(30) Foreign Application Priority Data

Jun. 28, 2002 (JP) ............................ 2002-190408

(51) Int. Cl.[7] ................................................ G02B 6/38
(52) U.S. Cl. ....................................................... 385/60
(58) Field of Search ............................. 385/60, 76, 78, 385/55, 72

(56) References Cited

U.S. PATENT DOCUMENTS 4,611,887 A * 9/1986 Glover et al. ................. 385/71
5,245,683 A * 9/1993 Belenkiy et al. .............. 385/72
5,287,425 A 2/1994 Chang ......................... 385/81

FOREIGN PATENT DOCUMENTS

DE 199 63 426 12/1999
JP 2505199 4/1996

OTHER PUBLICATIONS

Copy of German Patent Office Action for corresponding German Patent Application No. 103 25 825.6-51 dated Mar. 15, 2004 with translation.

* cited by examiner

*Primary Examiner*—Javaid H. Nasri
(74) *Attorney, Agent, or Firm*—Armstrong, Kratz, Quintos, Hanson & Brooks, LLP.

(57) ABSTRACT

An optical connector 1 includes a first connector 2 and a second connector 3. The first connector 2 includes a first ferrule 4 and a first housing 5. The terminal of an optical fiber 7 is attached to the first ferrule 4. The first housing 5 accommodates the first ferrule 4 so as to be movable along the axial line P of an optical fiber cable 7. The second connector 3 includes a second ferrule 20, a second housing 21 and a coil spring 23. The terminal of another optical fiber cable 7 is attached to the second ferrule 20. The second housing 21 accommodates the second ferrule 20 and the coil spring 23. The coil spring 23 urges the second ferrule 20 toward the first connector 2. Such a configuration provides an optical connector which permits the housings to be easily coupled with each other and suppresses the labor for assembling the connector.

2 Claims, 10 Drawing Sheets

OPTICAL CONNECTOR

BACKGROUND OF THE INVENTION

1. Field of the Invention

This invention relates to an optical connector for accommodating the terminal of an optical fiber for transmitting an optical signal.

2. Description of the Related Art

Conventionally, a wire harness has been employed for connection of an auxiliary machine of a motor vehicle. However, with an increase in the number of auxiliary machines and their circuits in recent years, there is a tendency of increasing the noise occurring when an electric signal is transferred. In order to suppress the increase in the noise, an optical fiber communication system has been proposed which employs an optical fiber in a part of the wire harness.

The above optical fiber communication system employs various optical connectors in order to convert an optical signal transmitted from an optical fiber cable into an electric signal and vice versa. Further, the optical fiber communication system employs various optical connectors in order to connect optical fibers to each other.

The optical connector employed to connect the optical fiber cables to each other includes a first housing and a second housing which can be coupled with each other. The first housing includes a ferrule attached to the terminal of one of the optical fibers and a coil spring which is an urging means for urging the ferrule toward the second housing. The second housing includes another ferrule attached to the terminal of the other of the optical fibers and another coil spring which is an urging means for urging the ferrule toward the first housing.

In the optical connector having the configuration described above, when the first and second housing are coupled with each other, the coil springs urge the corresponding ferrules to approach each other so that the ferrules are brought into contact with each other. Then, the ferrules leave each other so that the optical fibers are optically connected to other.

Thus, the optical connector optically connects the optical fibers to each other.

In the conventional optical connector, each of the first housing and the second housing is provided with the coil spring. Therefore, when the first housing and the second housing are to be coupled with each other, the first housing and the second housing must be brought near to each other by the force exceeding the urging force of the above coil spring. Namely, in order to couple the first housing and the second housing with each other, they must be brought near to each other by strong force. This makes it difficult to couple the first housing and the second housing with each other, and hence to connect the optical fiber cables to each other.

Since the first housing and the second housing are provided with the corresponding coil springs, respectively, increased time and labor must be taken, thereby increasing the number of man-hours for assembling the first housing and the second housing.

Further, when these housings are coupled with each other, the ferrules are brought into contact with each other. Therefore, when the coupling and decoupling between these housings are repeated, the ferrules may wear. The wearing of the ferrules may cause the optical axes of the ferrules to deviate from each other, thereby decreasing the transmission efficiency of the optical signal transmitted by these optical fiber cables. Further, since the ferrules are brought into contact with each other, in the worst case, the optical fiber cables may be damaged, thereby further reducing the transmission efficiency of the optical signal.

SUMMARY OF THE INVENTION

An object of this invention is to provide an optical connector which can easily couple housings with each other and reduce the time and labor needed for assembling.

In accordance with this invention, in order to attain the above object, there is provided an optical connector comprising:

a first ferrule attached to a terminal of a first optical fiber;

a first housing which accommodates the first ferrule;

a second ferrule attached to a terminal of a second optical fiber; and a second housing which accommodates the second ferrule and can be coupled with the first housing; the first and the second optical fiber being optically connected to each other when the first housing and the second housing are coupled with each other, wherein the first ferrule is movably supported by the first housing along an axial line of the optical fiber; and an urging means is accommodated in the second housing to urge the second ferrule toward the first housing and to urge the second housing in a direction leaving the first housing.

In this configuration, the first ferrule is movably supported within the first housing along the axial line of the optical fiber cable. The urging means, which is accommodated in the second housing, urges the second ferrule toward the first housing. Therefore, when the first housing and the second housing are coupled with each other, the first ferrule moves along the axial line of the optical fiber, thereby suppressing the force of causing these housings to approach each other.

Further, the first ferrule is movably supported within the first housing along the axial line of the optical fiber. The urging means for urging the first ferrule is not provided within the first housing. This suppresses the labor required to assemble the first connector.

When the first housing and the second housing are coupled with each other, the urging means urges the second housing in the direction of leaving the first housing. This prevents the first housing and the second housing from rattling.

In a preferred embodiment of the optical connector, the second housing includes an inner housing for accommodating the second ferrule and an outer housing for accommodating the inner housing, which can be coupled with the first housing, and the inner housing is urged toward the first housing by the urging means through the second ferrule so that when the outer housing is coupled with the first housing, the inner housing is brought into contact with the first ferrule.

In this configuration, when the outer housing of the second housing is coupled with the first housing, the inner housing is brought into contact with the first ferrule within the first housing. Therefore, even if the coupling/decoupling between the first housing and second housing is repeated, since the first ferrule and the second ferrule are not brought into contact with each other, the abrasion of these ferrules can be prevented.

The above and other objects and features of the invention will be more apparent from the following description taken in conjunction with the accompanying drawings.

DESCRIPTION OF THE PREFERRED EMBODIMENTS

Now referring to FIGS. 1 to 10, an explanation will be given of an optical connector according to an embodiment of this invention. An optical connector 1 according to the embodiment, as shown in FIGS. 1 to 10, a first connector 2 and a second connector 3 which can be freely coupled and decoupled.

The above optical connector 1 transmits an optical signal in such a manner that the first connector and the second connector are coupled.

Figure 3:
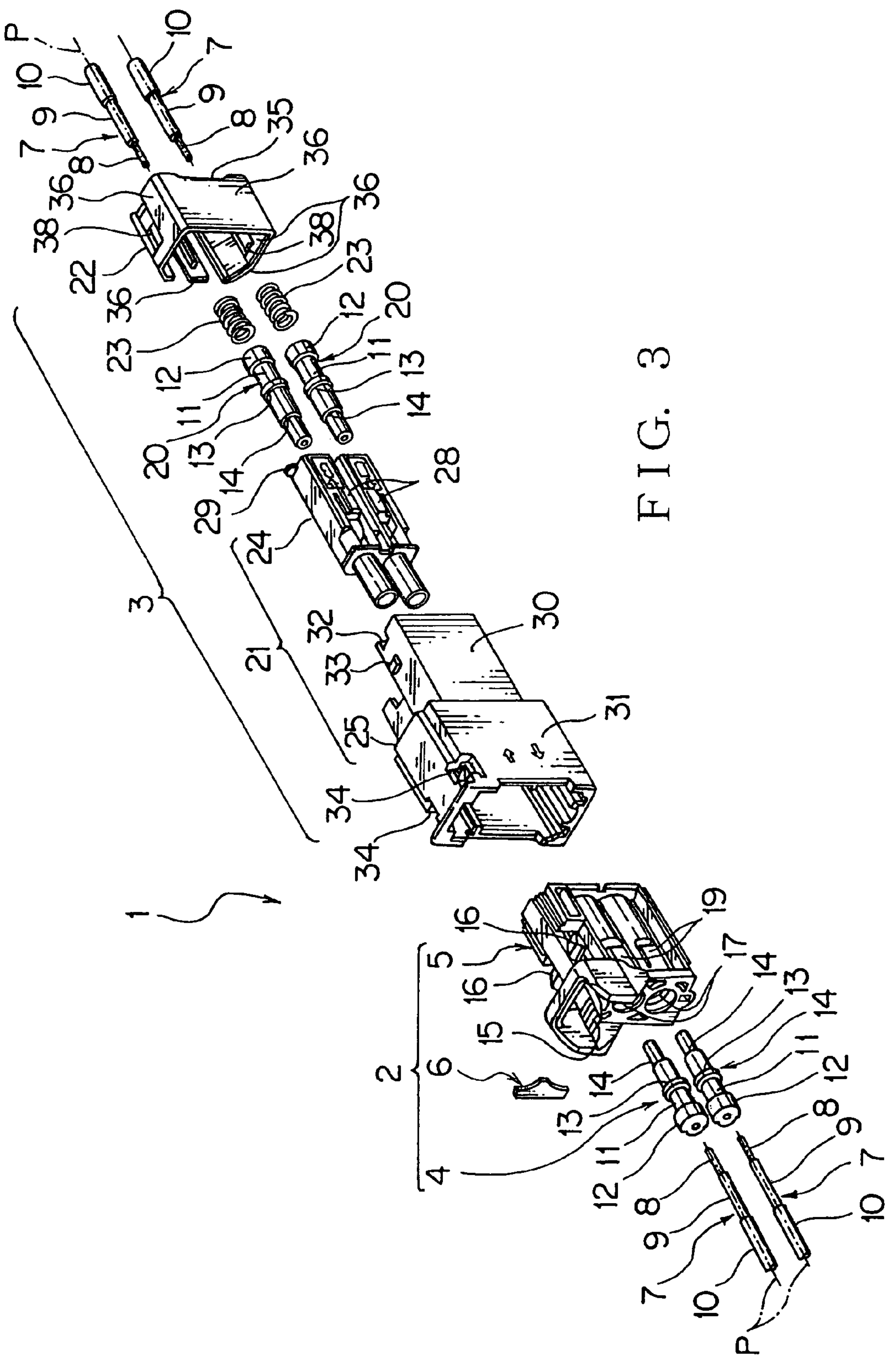
FIG. 3 is an exploded perspective view of the optical connector shown in FIG. 1.

The first connector 2, as shown in FIGS. 3, 5 to 10, includes a pair of first ferrules 4, a first housing 5 and a spacer 6 (FIGS. 3 and 6 to 10). Each of the first ferrules 4 is provided with an optical fiber cable 7. The optical fiber cable 7, as shown in FIG. 3, includes an optical fiber 8, a first sheath 9 and a second sheath 10. The optical fiber 8 is a well known multi-mode plastic fiber composed of a core and cladding which are formed to have different refraction indices and arranged coaxially.

The first and the second sheaths 9 and 10 are made of insulating synthetic resin, respectively. The first sheath 9 covers the optical fiber 8 so as to be protected. The second sheath 10 covers the optical fiber 8 and first sheath 9 so as to be protected. In the optical fiber cable 7, the first and second sheaths 9 and 10 are stripped so that the optical fiber 8 and first sheath 9 are exposed stepwise toward the one terminal.

The first ferrule 4 includes a hollow cylindrical cylinder 11, a flange 12 provided at the one end thereof and two steps 13 and 14 provided at the other end thereof. The flange 12 protrudes from the outer face of the cylinder 11. The steps 13 and 14 stepwise reduce the outer diameter of the cylinder 11 toward the other end of the cylinder 11.

The first ferrule 4 having the configuration described above accommodates the optical fiber 8 at the terminal of the optical fiber cable 7 inside the cylinder 11. Thus, the first ferrule 4 is attached to the terminal of the optical fiber 8. The first ferrules 4 are secured to the terminals of the corresponding optical fiber cables 7.

The first housing 5 is made of synthetic resin. The first housing 5 is formed as a box by plural outer walls which are continuous. On the one outer wall located at an upper position in FIG. 3 of the plural outer walls which constitute the first housing 5, a locking arm 15 is provided which is to be coupled with the second housing 21 of the second connector 3.

The locking arm 15 is elastically deformable. The locking arm 15 has a locking protrusion 16 at the center. When the locking arm is coupled with the second connector 3, after it is once elastically deformed, the locking protrusion 16 invades a locking hole 34 described later to be displaced to an initial position where the locking protrusion has not elastically deformed. Thus, the locking arm 15 is coupled with the second housing 21 of the second connector 3.

On the other outer wall located at a deep side in FIG. 3 of the above plural outer walls, an opening (not shown) is made. The opening penetrates through the outer wall to communicate the inside of the first housing 5 with the outside thereof.

The first housing 5 includes a pair of accommodating chambers 17. The accommodating chambers 17 are formed in a cylindrical shape, respectively and arranged in parallel. The accommodating chambers 17 each accommodates the first ferrule 4 and the terminal of the optical fiber 8 of the optical fiber cable 7. The first housing 5 accommodates a pair of the first ferrules 4 which are arranged in parallel.

The accommodating chamber 17 accommodates the first ferrule 4 so as to be movable along a corresponding axial line P (indicated by one-dot chain line in e.g. FIG. 1 and also referred to as an optical axis) of the optical fiber 8. The accommodating chamber 17, as shown in e.g. FIG. 6, has a contact portion 18 which can be brought into contact with a step 13 close to the center of the first ferrule 4. The contact portion 18 is kept in contact with the step 13 to prevent the first ferrule 4 from approaching the second connector 3. Therefore, the first ferrule 4 is accommodated within the first housing 5 of the first connector 2 so as to be movable along the corresponding axial line P (optical axis) between a position where the step 13 is in contact with the contact portion 18 and another position where the step 13 is apart from the contact portion 18.

Figure 4:
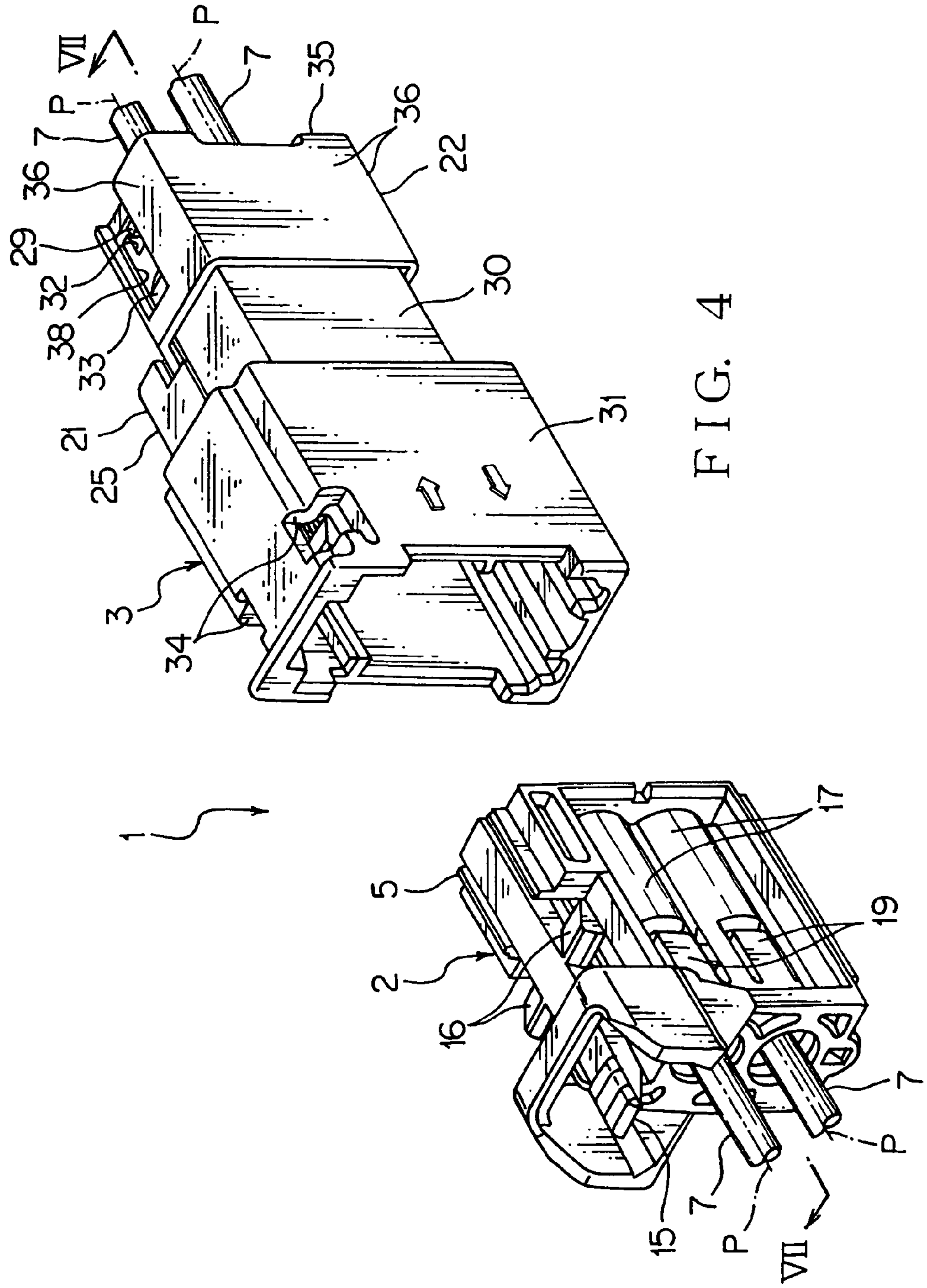
FIG. 4 is a perspective view of a first connector and a second connector of the optical connector shown in FIG. 1 in a state where they are separated from each other.
Figure 5:
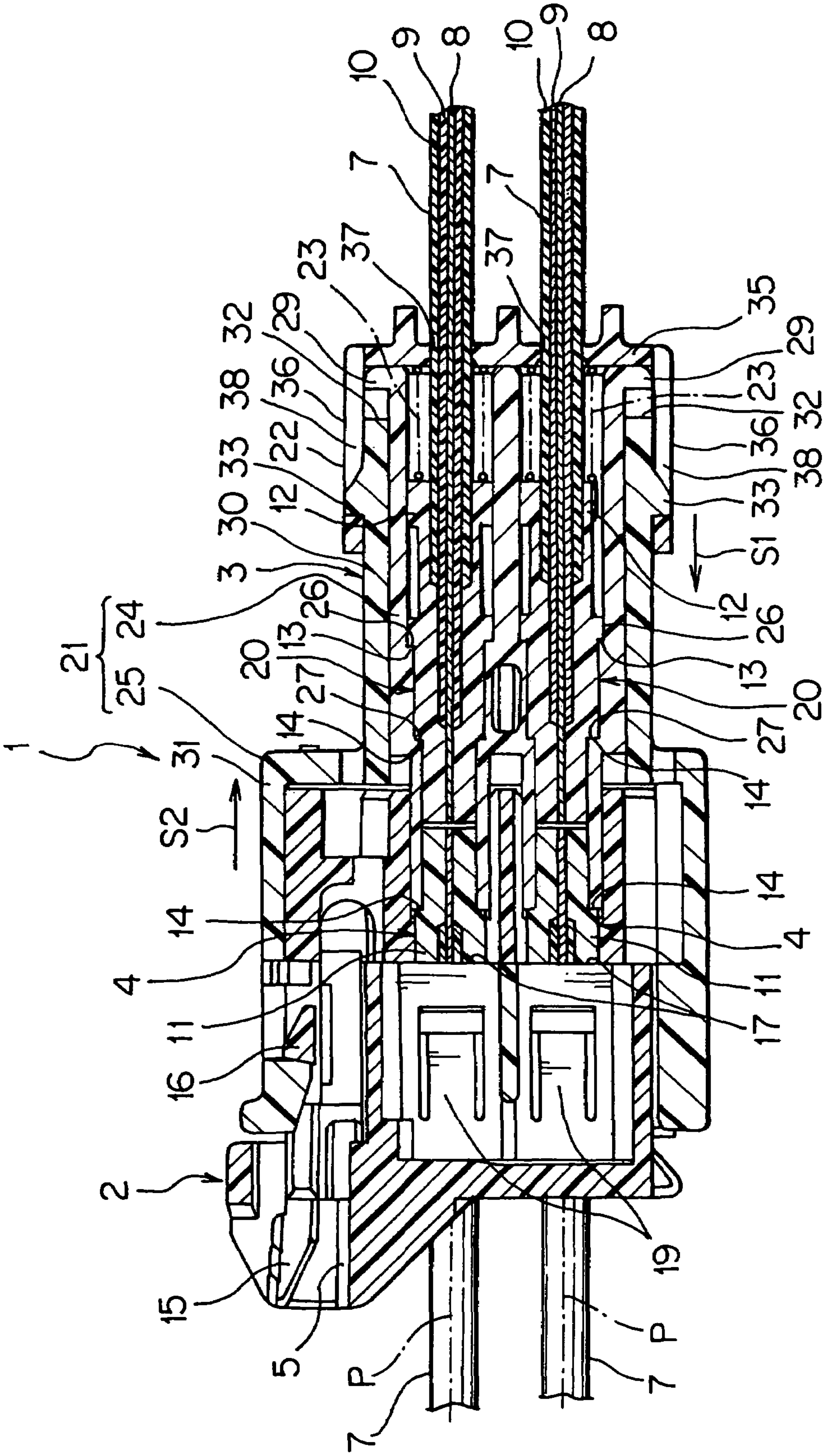
FIG. 5 is a sectional view taken in line A-B-C-D in FIG. 2.

The first housing 5, as shown in FIGS. 3 to 5, includes a pair of lances 19 which are integrally formed in the outer wall of the accommodating chamber 17 located on this side in FIG. 3. The lance 19 is secured to the first ferrule 4.

The spacer 6 can advance into the first housing 5 through the above opening. The spacer 6, when it advances into the first housing, can be secured to the first housing. When the spacer 6 is secured to the first housing 5, the first ferrules 4 accommodated within the first housing 5 are prevented from coming off from the first housing. The spacer 6, even when secured to the first housing 5, permits the first ferrule 5 to slide between the position where the step 13 is in contact with the contact portion 18 and another position where the step 13 is apart from the contact portion 18. In this way, the first ferrules 4 are movably supported along the axial line P of the optical fiber cable 7 within the first housing 5.

The first ferrule 4 is attached to the terminal of the optical fiber 8 of the optical fiber cable 7. The first ferrule 4 attached to the terminal of the optical fiber 8 is accommodated in the first housing 5. The spacer 6 is inserted into the first housing 5 through the opening so that the spacer 6 is secured to the first housing 5, thereby assembling the first connector 2. In this case, the first ferrule 4 is slidable between the position where the step 13 is in contact with the contact portion 18 and the position where the step 13 is apart from the contact portion 18.

The second connector 3, as shown in FIGS. 3, 5 to 10, includes a pair of second ferrules 20, a second housing 21, a spring cap 22 and a pair of coil springs 23 which serve as an urging means. The second ferrule 20 has the same configuration as the first ferrule 4. Therefore, the second ferrule 20 with like reference numerals referring to like elements of the first ferrule 4 will not be explained here. It is of course that the terminal of the optical fiber cable 7 is attached to the second ferrule 20.

The second housing 21, as seen from e.g. FIG. 3, includes an inner housing 24 and an outer housing 25. The inner housing 24 is made of synthetic resin and formed to have a cylindrical shape. The inner housing 24 accommodates a pair of second ferrules 20 arranged in parallel. The inner housing 24 accommodates the second ferrules 20 so as to be movable along the axial lines P of the corresponding optical fiber cables 7, respectively. The housing 24, as seen from e.g. FIG. 5, is provided with contact portions 26, 27 to be in contact with the steps 13, 14 of the second ferrule 20 and lances 28 (FIG. 3) serving as securing portions to be secured to the second ferrules 20, respectively and a projection 29.

With the first connector 2 and second connector 3 coupled with each other, when the contact portions 26 and 27 are brought into contact with the steps 13 and 14, the second ferrule 20 is prevented from approaching the first connector 2. The lances 28 are integrally formed on the outer wall of the inner housing 24. The lances 28 are secured to the second ferrules 20 accommodated in the inner housing 24, respectively, thereby preventing the second ferrules 20 from coming off from the inner housing 24.

The protrusion 29 is provided at the end of the inner housing 24 on the side apart from the first connector 2. The protrusion 29 protrudes from the outer face of the inner housing 24. The protrusion 29 is to advance into a recess 32 of the outer housing 25.

Further, with the contact portions 26, 27 in contact with the steps 13, 14, the inner housing 24 accommodates the terminals of the second ferrules 20, i.e. optical fibers 8 without being externally protruded. When the first connector 2 and the second connector 3 are coupled with each other, the inner housing 24 is brought into contact with the steps 14 of the first ferrules 4. In this case, the second ferrules 20 within the inner housing 24 are not brought into contact with the first ferrules 4. In this way, the inner housing 24 does not cause the second ferrules 20 to be brought into contact with the first ferrules 4.

The outer housing 25 is made of synthetic resin and formed to have a cylindrical shape. The outer housing 25 is integrally composed of a cylindrical inner housing accommodating portion 30 and a cylindrical connector accommodating portion 31. These inner housing accommodating portion 30 and connector housing portion 31 are arranged along the axial lines P of the optical fiber cables 7, i.e. optical fibers 8.

The inner housing accommodating portion 30 accommodates the inner housing 2. The inner housing accommodating portion 30 is provided with a recess 32 and a protrusion 33. The recess 32 is formed by recessing the end of the inner housing accommodating portion 30 on the side apart from the connector accommodating portion 31. The protrusion 29 is to advance into the recess 29. The protrusion 33 is arranged in the vicinity of the recess 32 and protrudes from the outer face of the inner housing accommodating portion 30.

The connector accommodating portion 31 accommodates the first connector 2. The connector accommodating portion 31 is larger than the inner housing accommodating portion 30 in size.

The connector accommodating portion 31 has locking holes 34. The locking holes 34 penetrate through the wall constituting connector accommodating portion 31. The locking protrusions 16 of the locking arm 15 advance into the locking holes 34, respectively so that the locking arm 15, i.e. the first housing 5 of the first connector 2 is coupled with the outer housing 25 of the second connector 3. Thus, the first connector 2 is coupled with the second connector 3.

The spring cap 22 is formed as a closed-end cylinder composed of a single wall 35 and a plurality of peripheral walls 36 which are upright from the edges of the single wall 35. Optical fiber passing holes 37 penetrate through the single wall 35. The optical fiber cables 7 can pass through the optical fiber passing holes 37. The upper and lower peripheral walls of the plurality of peripheral walls 36 in FIG. 3 have locking holes 38, respectively, which penetrate through themselves.

The protrusions 33 of the inner housing accommodating portion 30 advance into the locking holes 38, respectively. The protrusions 33 advance into the locking holes 38 so that the inner housing accommodating portion 30, i.e. second housing 21 is coupled with the spring cap 22.

The coil springs 23 each permits the optical fiber cable 7 to pass inside itself. The coil springs 23 are arranged between the second ferrule 20 and the single wall 35 of the spring cap 22 in such a fashion that the optical fiber cables 7 with the terminals attached to the second ferrules 20 pass through the coil springs 23, respectively. In this state, the coil springs 23 are accommodated within the inner housing 24 of the second housing 21. When the coil springs 23 are arranged between the single wall 35 of the spring cap 22 and the corresponding second ferrules 20, they urge the second ferrules 20 toward the connector accommodating portion 31, i.e. the first connector 2.

Further, the coil springs 23 urge the single wall 35 of the spring cap 22 in a direction leaving the connector accommodating portion 31. Therefore, the urging force of the coil springs 23 is transmitted to the outer housing 25, i.e. the second housing 21 through the protrusions 33 coupled with the locking holes 38 of the spring caps 22. Thus, the coil springs 23 urge the outer housing 25, i.e. second housing 21 in a direction leaving the first connector 2 along an arrow S2 in FIG. 5.

The terminals of the optical fiber cables 7 are attached to the second ferrules 20, respectively. The optical fiber cables 7 are passed through the insides of the coil springs 23, and the coil springs 23 are brought into contact with the flanges of the second ferrules 12. The inner housing 24 is inserted in the outer housing 25. The optical fiber cables 7 are passed through the optical fiber passing holes 37. In this case, the coil springs 23 are sandwiched between the second ferrule 20 and the single wall 35. The protrusions 33 of the outer housing 25 are fit in the locking holes 38 of the spring cap 22.

Figure 8:
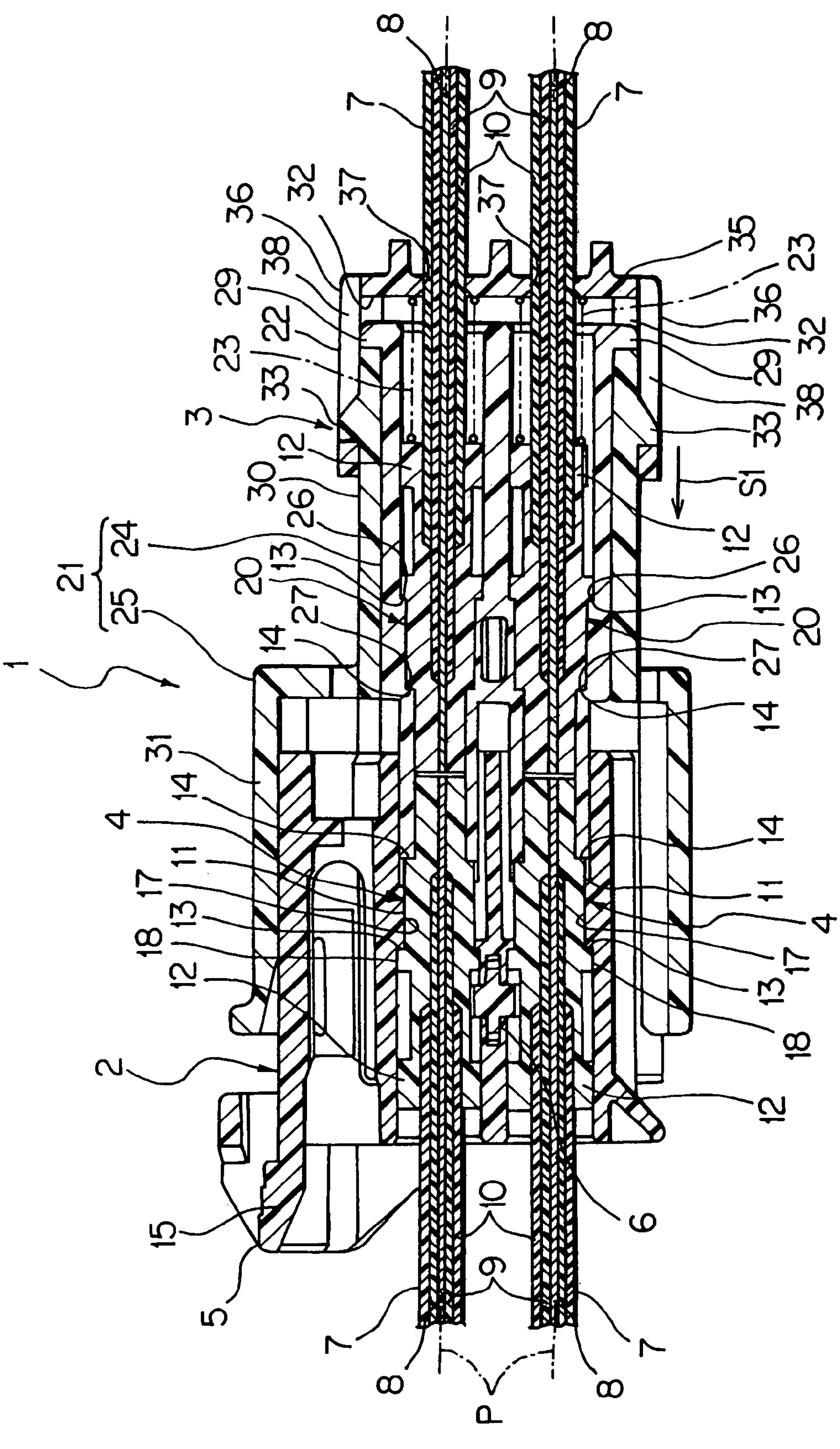
FIG. 8 is a sectional view of the state when the first connector has been inserted into an accommodating portion of the second connector.

In this way, the second connector 3 having the configuration described above is assembled. In this case, the urging force of the coil springs 23 keeps the steps 13, 14 of the second ferrules 20 in contact with the contact portions 26 and 27 of the inner housing 24. Further, the second ferrules 20 are slidable between the position where the steps 13, 14 are in contact with the contact portions 26, 27 and the position where the steps 13, 14 are apart from the contact portions 26, 27.

Where the first connector 2 and the second connector 3 are coupled with other to assemble the optical connector 1 described above, as seen from FIGS. 4 and 7, the connector accommodating portion 31 of the second housing 21 and the first connector 2 are faced each other along the axial lines P of the optical fiber cables 7. Thereafter, the first connector 2 is gradually inserted into the second housing 21 of the second connector 3. Then, as shown in FIG. 8, the end of the inner housing 24 close to the first connector 2 is brought into contact with the steps 14 of the first ferrules 4 closest to the second connector 3. In this case, in the example shown in FIG. 8, the steps 13 of the first ferrules 4 are in contact with the contact portions 18 of the first housing 5, respectively.

Figure 9:
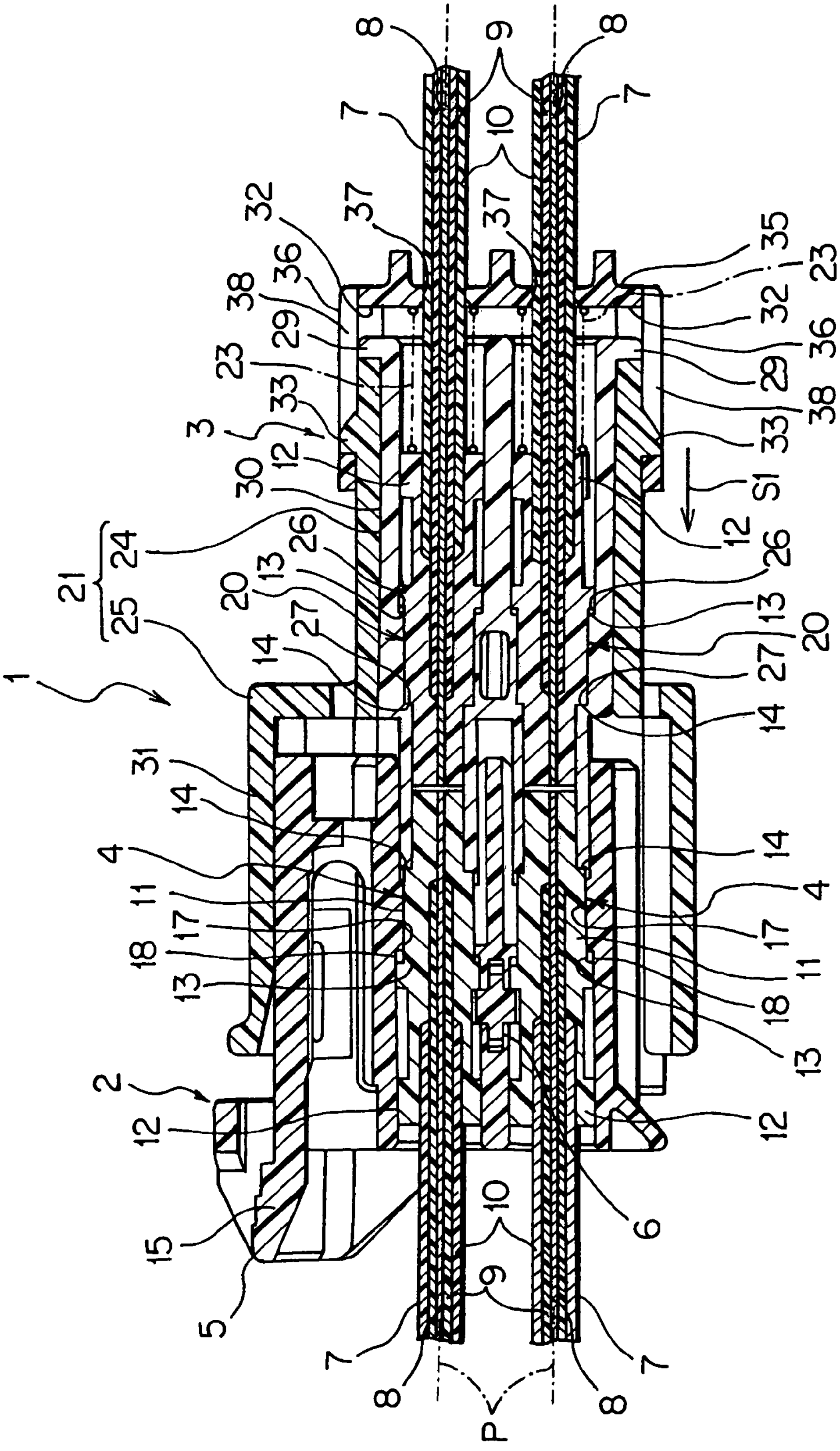
FIG. 9 is a sectional view of the state where the first ferrule has moved from the state shown in FIG. 8 to a position where a step is apart from a connecting portion.

As the first connector 2 is inserted into the connector accommodating portion 31 of the second connector 3, as seen from FIG. 9, the first ferrules 4 move to the position where the steps 13 are spaced apart from the contact portions 18, respectively. Eventually, the first ferrules 4 interfere with the spacer 6 to become immovable.

Figure 1:
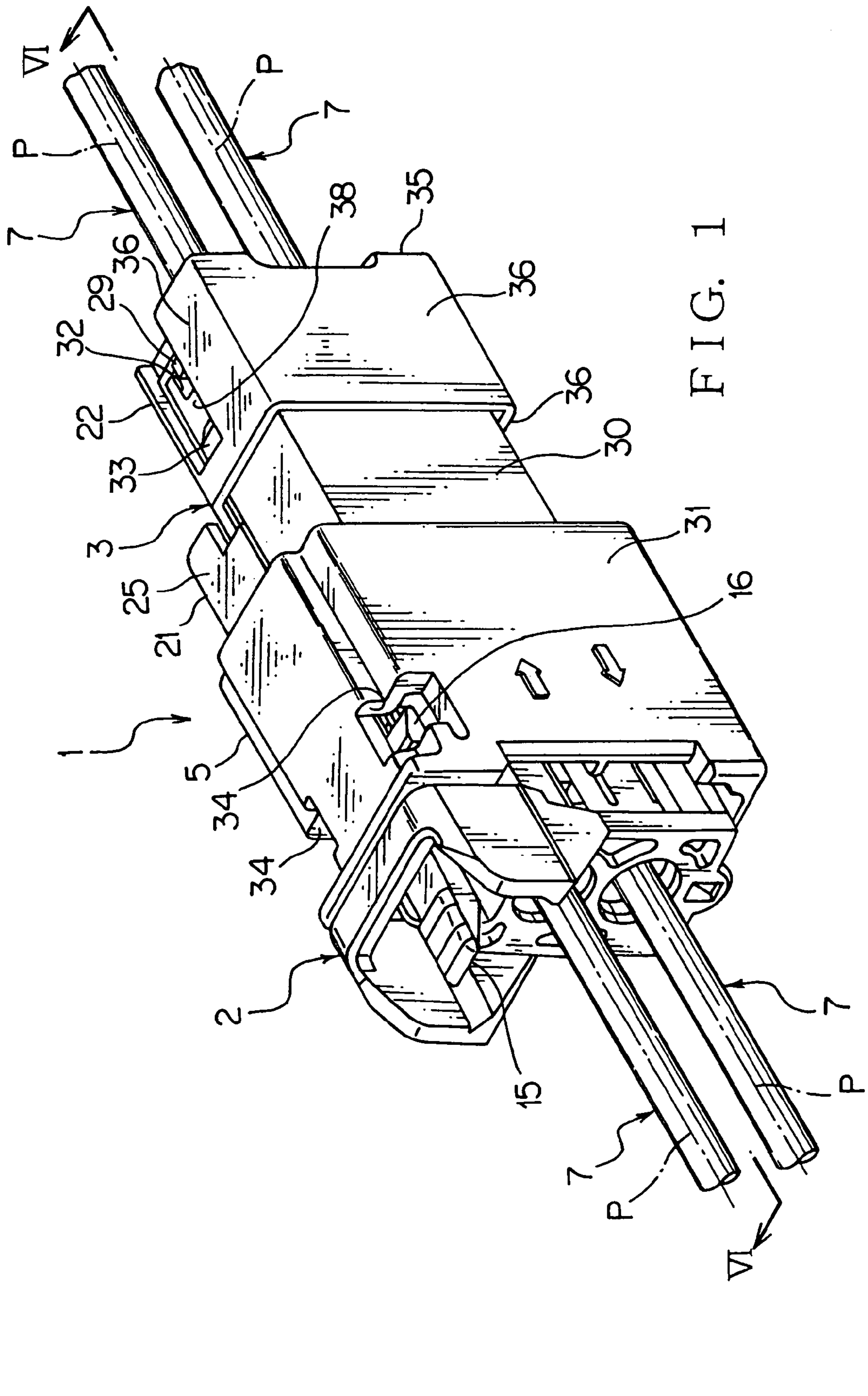
FIG. 1 is a perspective view of an optical connector according to an embodiment of this invention.
Figure 2:
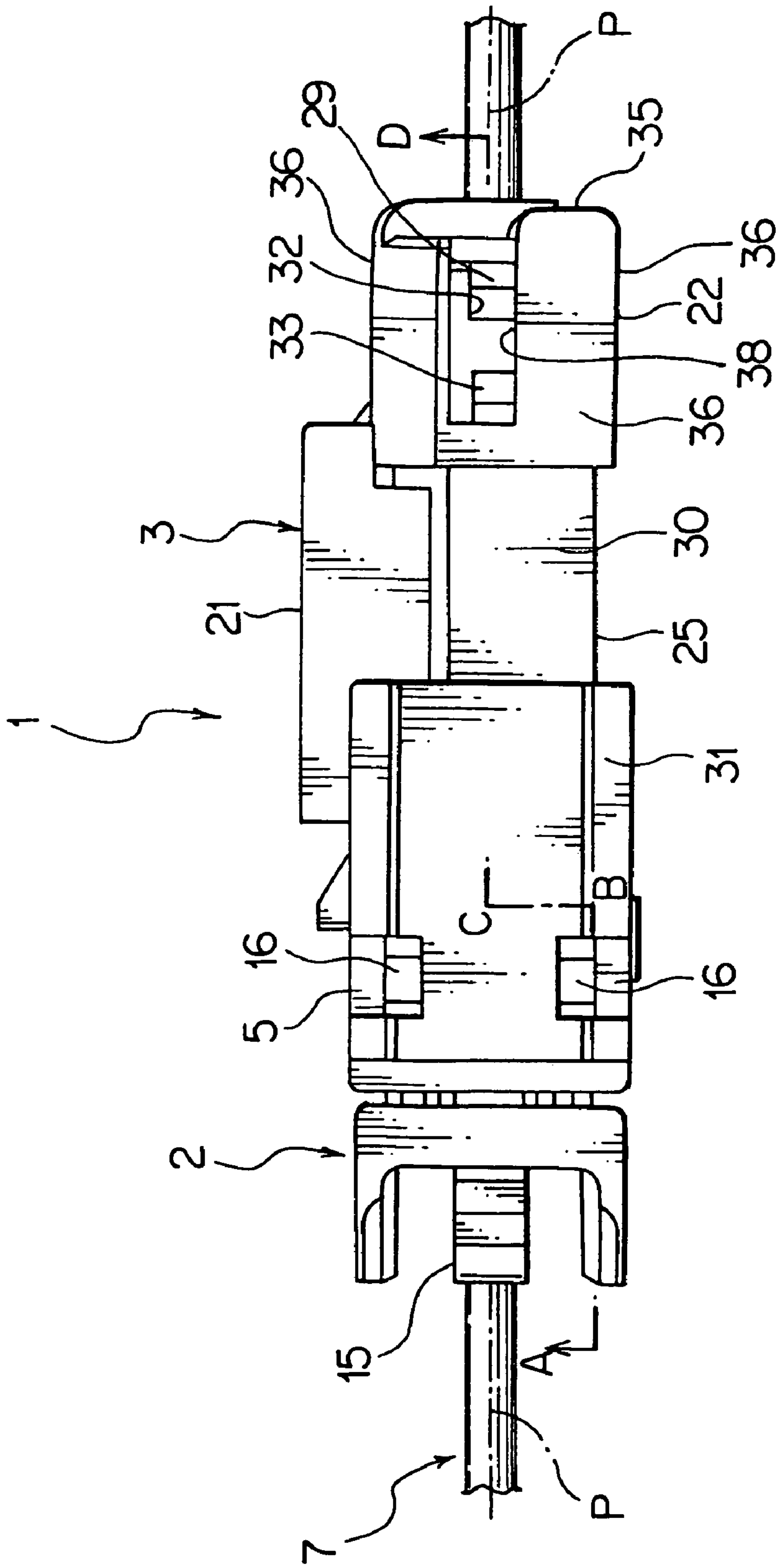
FIG. 2 is a plan view of the optical connector shown in FIG. 1.
Figure 6:
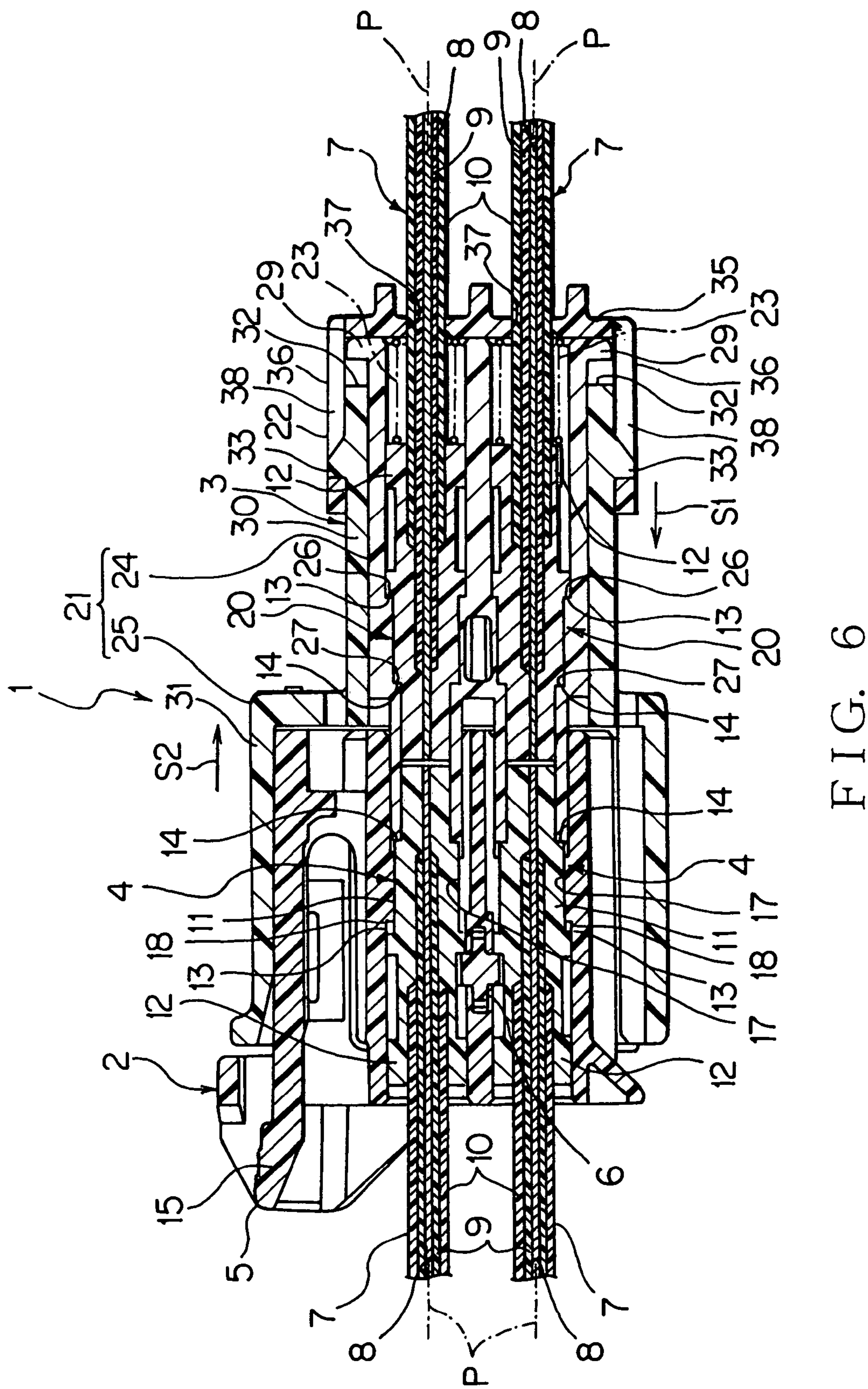
FIG. 6 is a sectional view taken in line VI—VI in FIG. 1.
Figure 7:
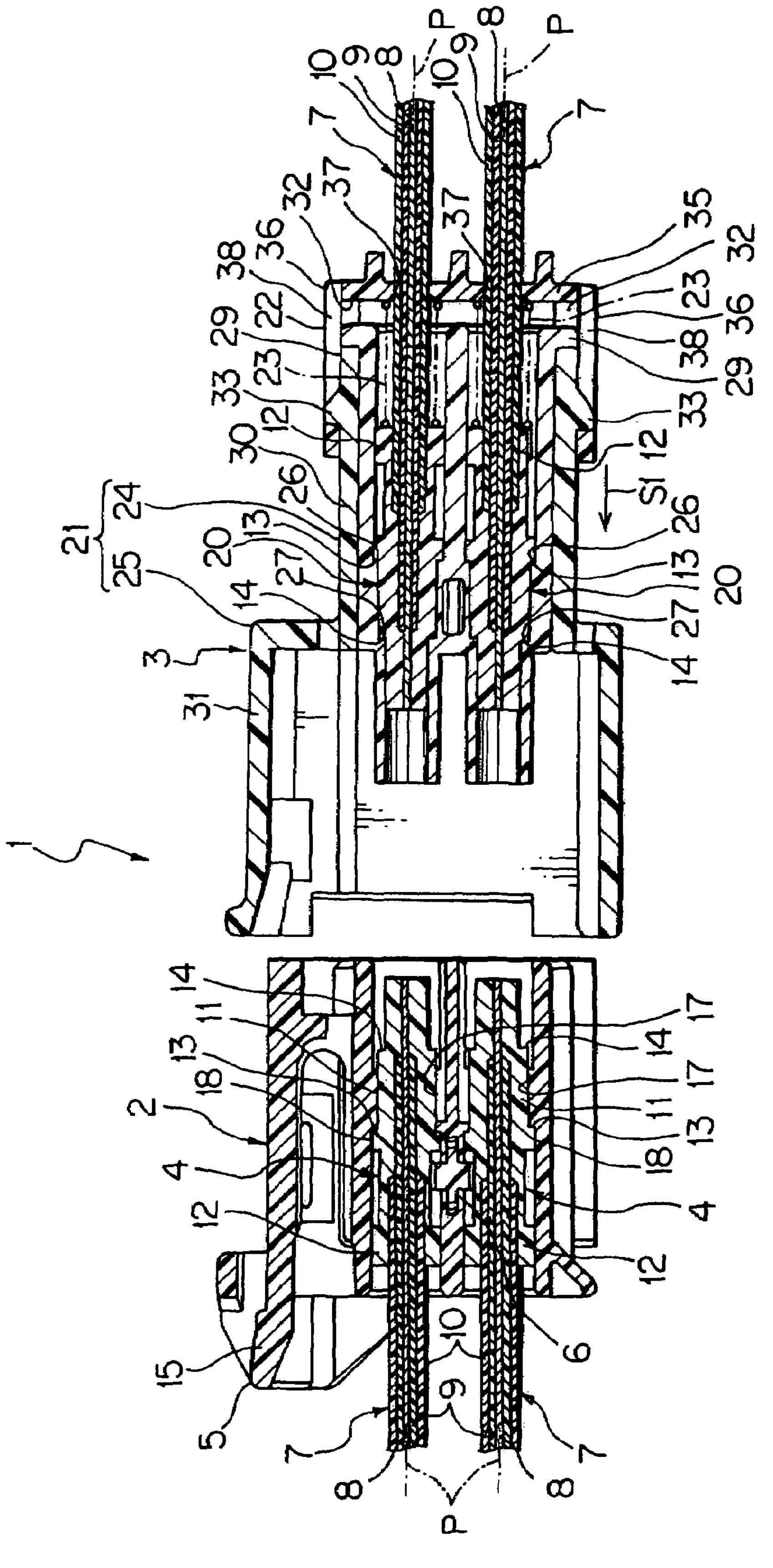
FIG. 7 is a sectional view taken in line VII—VII in FIG. 4.
Figure 10:
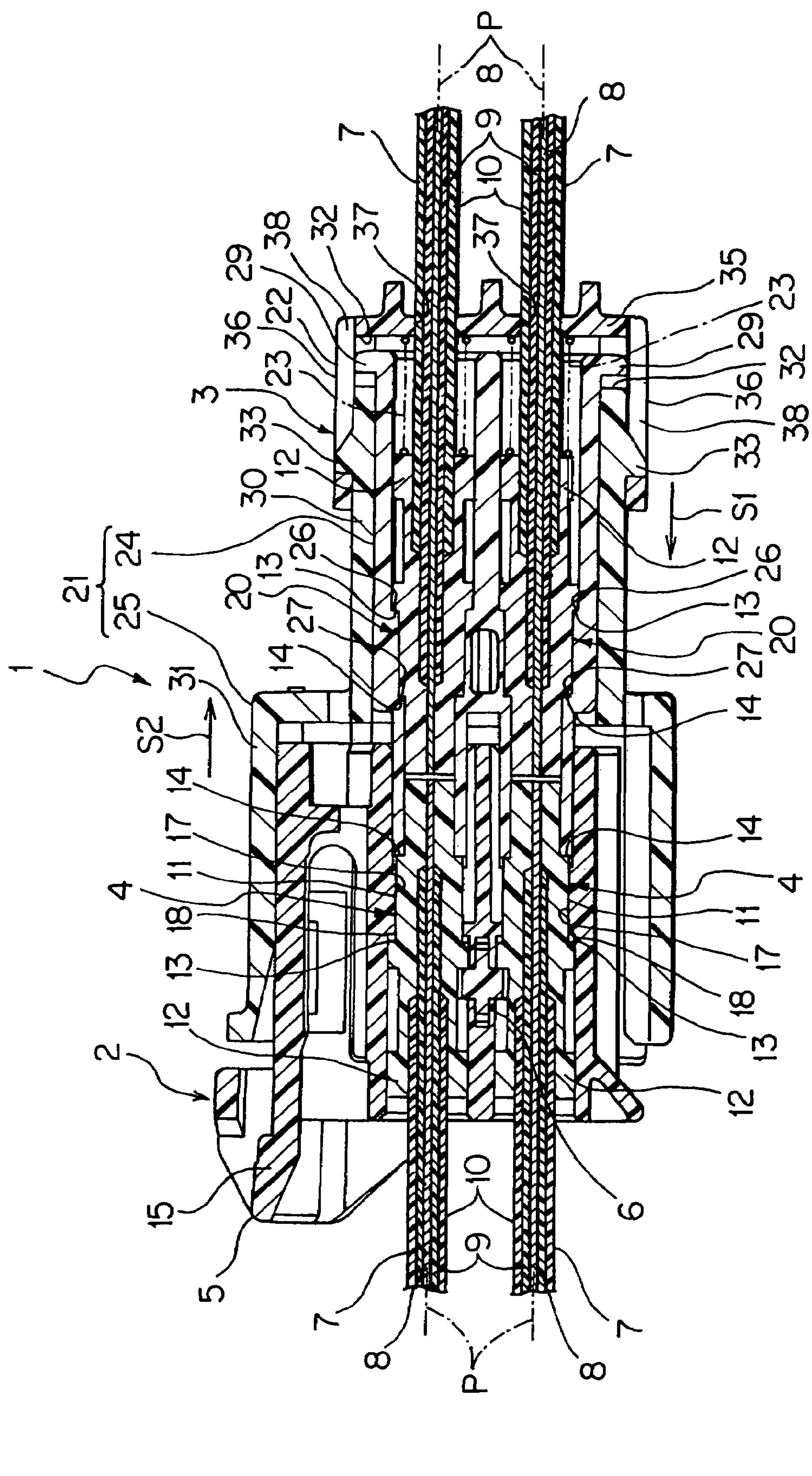
FIG. 10 is a sectional view of the state where the second ferrule has moved from the state shown in FIG. 9 to a position where a step is apart from a connecting portion.

Further, as the first connector 2 is inserted into the connector accommodating portion 31 of the second connector 3, it is pushed by the first ferrule 4 so that as shown in FIG. 10, the inner housing 24 as well as the second ferrule 20 leaves the first connector 2 against the urging force of the coil spring 23. Further, as shown in FIG. 5, the locking protrusion 16 is fit in the locking hole 34 so that as shown in FIGS. 5 and 6, the first connector 2 and the second connector 3 are coupled with each other. Then, the optical fibers 8 are optically coupled with each other, thereby assembling the optical connector 1 as shown in FIGS. 1 and 2.

In accordance with this embodiment, the first ferrule 4 is movably supported within the first housing 5 along the axial line P of the optical fiber cable 7, i.e. optical fiber 8. The coil spring 23 accommodated within the second housing 21 urges the second ferrule 20 toward the first housing 5. Therefore, when the first housing and the second housing 21 are coupled with each other, the first ferrule 4 moves along the axial line P of the optical fiber 8, thereby suppressing the force of causing these housings 5 and 21 to approach each other. Therefore, these housings 5 and 21 can be easily coupled with other.

Further, the first ferrule 4 is movably supported within the first housing 5 along the axial line P of the optical fiber 8. No coil spring for urging the first ferrule 4 is provided within the first housing 5. This suppresses the labor required to assemble the first connector 2, thereby suppressing the labor required to assemble the optical connector 1.

When the first housing 5 and the second housing 21 are coupled with each other, the coil springs 23 urge the second housing 21 in the direction of leaving the first housing 5. This prevents the first housing 5 and the second housing 21 from rattling from each other. Thus, when these housings 5 and 21 are attached to the moving body such as a motor vehicle, it is possible to prevent the housings 5 and 21 from rattling owing to vibration during vehicle running. Thus, the mutual deviation of the optical axes of the optical fibers 8 with the terminals accommodated within the first and the second housings can be prevented, thereby preventing the transmission efficiency of the optical signal transmitted by the optical fibers 8 from lowering.

When the outer housing 25 of the second housing 21 is coupled with the first housing 5, the inner housing 24 is brought into contact with the steps 14 of the first ferrules 4 within the first housing 5 so that the first ferrules 4 and the second ferrules 21 are not brought into contact with each other. Therefore, even if the coupling/decoupling between the first housing 5 and second housing 21 is repeated, since the ferrules 4 and ferrules 20 are not brought into contact with each other, the abrasion of these ferrules 4 and 20 can be prevented. Thus, the optical fibers 8 can be surely optically coupled with each other, thereby preventing the transmission efficiency of the optical signal transmitted by the optical fibers 8 from lowering.

Incidentally, the contents of Japanese Patent Appln. No. 02-190408 filed on Jun. 28, 2002 are hereby incorporated by reference.

What is claimed is:

1. An optical connector comprising:

a first ferrule attached to a terminal of a first optical fiber;

a first housing which accommodates said first ferrule;

a second ferrule attached to a terminal of a second optical fiber;

a second housing which accommodates the second ferrule and can be coupled with the first housing; the first and the second optical fiber being optically connected to each other when the first housing and the second housing are coupled with each other;

an inner housing for accommodating said second ferrule in the second housing;

an outer housing for accommodating the inner housing, which can be coupled with the first housing;

an urging means accommodated in said second housing to urge said second ferrule toward the first housing and to urge the second housing in a direction leaving said first housing; and a spacer secured to the first housing to prevent the first ferrule from coming off from the first housing, wherein said first ferrule is movably supported by the first housing along an axial line of said first optical fiber, and said inner housing is urged toward said first housing by said urging means through said second ferrule so that when said outer housing is coupled with said first housing, said inner housing is brought into contact with the first ferrule, and moves the first ferrule until the first ferrule abuts the spacer.

2. An optical connector according to claim 1, wherein said first ferrule has a step near a center of said first ferrule, said first housing has a contact portion, with said first ferrule being accommodated in said first housing so as to be movable along the axial line of said first optical fiber between a first position where said step contacts said contact portion and a second position where said step is spaced apart from said contact portion.

* * * * *